US010936122B2

(12) United States Patent
Zhang et al.

(10) Patent No.: US 10,936,122 B2
(45) Date of Patent: Mar. 2, 2021

(54) TOUCH CONTROL COMPONENT, MANUFACTURING METHOD THEREOF, TOUCH DISPLAY DEVICE AND METHOD FOR PREVENTING MISTAKEN TOUCH CAUSED BY LIQUID

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Donghui Zhang, Beijing (CN); Xiaoye Ma, Beijing (CN); Zhou Rui, Beijing (CN); Rui Yin, Beijing (CN); Xiuli Si, Beijing (CN)

(73) Assignees: Hefei Xinsheng Optoelectronics Technology Co., Ltd., Anhui (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/483,346

(22) PCT Filed: Jan. 2, 2019

(86) PCT No.: PCT/CN2019/070044
§ 371 (c)(1),
(2) Date: Aug. 2, 2019

(87) PCT Pub. No.: WO2019/174371
PCT Pub. Date: Sep. 19, 2019

(65) Prior Publication Data
US 2020/0356232 A1 Nov. 12, 2020

(30) Foreign Application Priority Data
Mar. 15, 2018 (CN) .......................... 201810214566.2

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01); *G06F 2203/04103* (2013.01); *G06F 2203/04106* (2013.01)

(58) Field of Classification Search
CPC ................ G06F 3/04186; G06F 3/044; G06F 2203/04106; G06F 2203/04103
See application file for complete search history.

(56) References Cited

U.S. PATENT DOCUMENTS

| | | | | |
|---|---|---|---|---|
| 7,920,130 | B2* | 4/2011 | Tien | ................... G06K 9/00013 345/173 |
| 8,441,422 | B2* | 5/2013 | Abileah | .............. G02F 1/13338 345/87 |

(Continued)

FOREIGN PATENT DOCUMENTS

| | | |
|---|---|---|
| CN | 101706621 A | 5/2010 |
| CN | 103034386 A | 4/2013 |

(Continued)

OTHER PUBLICATIONS

First Office Action and English language translation, CN Application No. 201810214566.2, dated Jun. 17, 2019, 18 pp.

*Primary Examiner* — Grant Sitta
(74) *Attorney, Agent, or Firm* — Myers Bigel, P.A.

(57) ABSTRACT

The present disclosure provides a touch control component, a method for manufacturing the same, a touch display device, and a method for preventing mistaken touch caused by liquid. The touch control component includes a touch electrode layer configured to sense a touch area within a touch surface, and a light sensing film superposed with the touch electrode layer. A light receiving surface of the light sensing film faces the touch surface. The touch control (Continued)

component has a simple structure and is easy to implement. By sensing the intensity of the reflected light from the touch surface using the light sensing film, the wetted area of the water layer can be identified, thereby effectively avoiding mistaken touch caused by liquid.

6 Claims, 8 Drawing Sheets

(56) References Cited

U.S. PATENT DOCUMENTS

| | | | | |
|---|---|---|---|---|
| 2008/0297487 A1* | 12/2008 | Hotelling | ............. | G06F 3/0446 345/173 |
| 2009/0021487 A1* | 1/2009 | Tien | ............. | G06F 3/041 345/173 |
| 2009/0128499 A1* | 5/2009 | Izadi | ............. | G06F 3/0428 345/173 |
| 2010/0078230 A1* | 4/2010 | Rosenblatt | ............. | G06F 3/041 178/18.01 |
| 2011/0122075 A1* | 5/2011 | Seo | ............. | G06F 3/042 345/173 |
| 2013/0092838 A1* | 4/2013 | Weber | ............. | G01J 1/06 250/353 |
| 2014/0028629 A1* | 1/2014 | Drumm | ............. | G06F 3/0308 345/175 |
| 2014/0176491 A1 | 6/2014 | Zhao et al. | | |
| 2014/0192023 A1* | 7/2014 | Hoffman | ............. | G06F 3/0421 345/175 |
| 2015/0062069 A1* | 3/2015 | Shin | ............. | G06F 3/044 345/174 |
| 2015/0317034 A1* | 11/2015 | Kent | ............. | G06F 3/0421 345/175 |
| 2015/0331545 A1* | 11/2015 | Wassvik | ............. | G02B 6/4214 345/173 |
| 2016/0283772 A1* | 9/2016 | Nelson | ............. | G06K 9/00 |
| 2017/0084668 A1* | 3/2017 | Wang | ............. | G06F 3/0421 |
| 2017/0109561 A1* | 4/2017 | Wyrwas | ............. | G06F 3/0443 |
| 2018/0246612 A1* | 8/2018 | Lynn | ............. | G06F 3/0412 |
| 2018/0247099 A1 | 8/2018 | Liu et al. | | |

FOREIGN PATENT DOCUMENTS

| | | |
|---|---|---|
| CN | 103809789 A | 5/2014 |
| CN | 104461164 A | 3/2015 |
| CN | 104752462 A | 7/2015 |
| CN | 104793812 A | 7/2015 |
| CN | 106095211 A | 11/2016 |
| CN | 106484197 A | 3/2017 |
| CN | 107480639 A | 12/2017 |
| CN | 108304096 A | 7/2018 |

* cited by examiner

TOUCH CONTROL COMPONENT, MANUFACTURING METHOD THEREOF, TOUCH DISPLAY DEVICE AND METHOD FOR PREVENTING MISTAKEN TOUCH CAUSED BY LIQUID

RELATED APPLICATIONS

The present application is a 35 U.S.C. 371 national stage application of PCT International Application No. PCT/CN2019/070044, filed on Jan. 2, 2019, which claims the benefit of Chinese Patent Application No. 201810214566.2, filed on Mar. 15, 2018, the entire disclosures of which are incorporated herein by reference.

TECHNICAL FIELD

The present disclosure relates to the field of touch technology, and in particular, to a touch control component, a method for manufacturing the same, a touch display device, and a method for preventing mistaken touch caused by liquid.

BACKGROUND

Capacitive touch display devices have the advantages of high sensitivity and supporting multi-touch. Therefore, the capacitive touch display devices are favored by consumers and occupy most of the market for touch panels of existing smart products. However, the sensitivity of the capacitive touch display device depends on the stability of the electric field near the cover glass. Once the environmental factors affect the electric field, it is easy to cause mistaken touch. A typical type of mistaken touch occurs when the user wets the touch display device. The touch electrode is likely to misidentify the water layer wetted area as a user's desired touch area, resulting in unexpected touch feedback for the user. Therefore, the current touch display device still needs to be improved.

SUMMARY

To this end, embodiments of the present disclosure provide a touch control component, a method for manufacturing the same, a touch display device, and a method for preventing mistaken touch caused by liquid.

In an aspect of the present disclosure, a touch control component is provided. The touch control component includes: a touch electrode layer configured to sense a touch area within a touch surface; and a light sensing film superposed with the touch electrode layer. A light receiving surface of the light sensing film faces the touch surface.

In some embodiments, the light sensing film is located on a side of the touch electrode layer facing the touch surface.

In some embodiments, the light sensing film includes a plurality of first photosensors and a plurality of second photosensors; the plurality of first photosensors are spaced apart in a first direction, each of the first photosensors extends in a second direction; the plurality of second photosensors are spaced apart in the second direction, each of the second photosensors extends in the first direction; the first direction and the second direction intersect with each other.

In some embodiments, the light sensing film includes: a plurality of photosensors arranged in an array.

In some embodiments, an orthographic projection of the touch electrode layer on the touch surface covers an orthographic projection of the light sensing film on the touch surface.

In another aspect of the present disclosure, a touch display device is provided. The touch display device includes: a display panel including a first substrate; and the touch control component according to any one of the abovementioned embodiments. The touch electrode layer of the touch control component is superposed with the first substrate.

In some embodiments, the touch display device further includes: a black matrix. The black matrix is located on a side of the light sensing film away from the touch surface. The light sensing film includes a plurality of first photosensors and a plurality of second photosensors; the plurality of first photosensors are spaced apart in a first direction, each of the first photosensors extends in a second direction; the plurality of second photosensors are spaced apart in the second direction, each of the second photosensors extends in the first direction; the first direction and the second direction intersect with each other. An orthographic projection of the black matrix on the first substrate completely covers an orthographic projection of the plurality of first photosensors and the plurality of second photosensors on the first substrate.

In some embodiments, the touch display device further includes a black matrix. The black matrix is located on a side of the light sensing film away from the touch surface. The light sensing film includes a plurality of photosensors arranged in an array. An orthographic projection of the black matrix on the first substrate completely covers an orthographic projection of the plurality of photosensors on the first substrate.

In some embodiments, the touch display device further includes a protective cover plate superposed with the first substrate. A surface of the protective cover plate facing away from the first substrate serves as the touch surface. The light sensing film is located between the protective cover plate and the first substrate.

In some embodiments, the touch display device further includes a second substrate located opposite to the first substrate. The touch electrode layer is located on a surface of the first substrate facing or away from the second substrate, and the light sensing film is located on a surface of the touch electrode layer facing or away from the first substrate.

In some embodiments, the touch display device further includes a second substrate located opposite to the first substrate. One of the touch electrode layer and the light sensing film is located on a surface of the first substrate facing the second substrate; the other of the touch electrode layer and the light sensing film is located on a surface of the first substrate away from the second substrate.

In some embodiments, the touch display device further includes a polarizer located between the protective cover plate and the first substrate. One of the touch electrode layer and the light sensing film is located between the protective cover plate and the polarizer; the other of the touch electrode layer and the light sensing film is located on one of: a surface of the protective cover plate facing the first substrate, a surface of the polarizer facing the protective cover plate, a surface of the polarizer away from the protective cover plate, a surface of the first substrate facing the protective cover plate, and a surface of the first substrate away from the protective cover plate.

In another aspect of the present disclosure, a method for preventing mistaken touch caused by liquid is provided. The touch display device includes a display panel and a touch control component. The display panel includes a first substrate. The touch control component includes: a touch electrode layer configured to sense a touch area within a touch surface, and a light sensing film superposed with the touch electrode layer; a light receiving surface of the light sensing film faces the touch surface; the touch electrode layer of the touch control component is superposed with the first substrate. The method includes: determining the touch area by using the touch electrode layer; sensing an intensity of reflected light from the touch surface by the light sensing film; and determining the touch area as one of a mistaken touch position of water layer and a normal touch position based on a change trend of the intensity of the reflected light in a direction from an edge of the touch area to a center of the touch area. If the intensity of the reflected light is gradually increased in the direction from the edge of the touch area to the center of the touch area, the touch area is determined as the mistaken touch position of water layer. If the intensity of the reflected light remains unchanged in the direction from the edge of the touch area to the center of the touch area, the touch area is determined as the normal touch position.

In some embodiments, the method further includes: based on the mistaken touch position of water layer and a thickness of a water layer, performing signal compensation to a portion of the touch electrode layer corresponding to the mistaken touch position of water layer, thereby eliminating an electrical influence of the water layer.

In yet another aspect of the present disclosure, a method for manufacturing a touch control component is provided. The method includes: forming a touch electrode layer, the touch electrode layer being configured to sense a touch area within a touch surface; and forming a light sensing film superposed with the touch electrode layer. A light receiving surface of the light sensing film faces the touch surface.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

Embodiments of the present disclosure are described in detail below. The embodiments described below are illustrative only and are not to be construed as limiting the disclosure. Where specific techniques or conditions are not indicated in the examples, they are carried out according to the techniques or conditions described in the literatures in the art or in accordance with the product specifications. The reagents or instruments used are not indicated with the manufacturer, and are conventional products that can be obtained commercially.

The present disclosure is based on the following findings and realization of the inventors: a touch display device typically utilizes a touch electrode layer to sense user's operation on the touch screen and output electrical signals to a touch chip (touch IC). When a wet finger of the user approaches the touch surface of the touch display device or water is sputtered onto the touch surface, although the finger is not in contact with the touch surface, since the relative dielectric constant of water is much larger than the relative dielectric constant of air, the electric field in the lower part of the water layer (i.e., the wetted area) is much stronger than that of the unwetted area. The touch electrode layer may easily erroneously recognize the wetted area as a hand touched area and send an electrical signal to the touch IC, resulting in unexpected feedback of touch screen. In view of the above technical problems, the inventors have found that during normal operation of the touch display device, when the incident angle of the light emitted by the backlight is greater than the critical angle θ1, the incident light is totally reflected at the interface between the protective cover plate (generally a glass cover plate) and air. In the wetted area, total reflection also occurs when the incident angle of the light emitted by the backlight is greater than the critical angle θ2. Since the refractive index of water is between the refractive index of glass and the refractive index of air, it is known that θ2 is necessarily larger than θ1. Therefore, at the edge of the wetted area, the reflected light is weak. The reflected light inside the wetted area has substantially the same light intensity as the reflected light outside the wetted area. If the user touches the touch surface of the touch display device with a finger, the edge of the touch area has a weak intensity of reflected light, and the inside of the touch area has a substantially uniform intensity of reflected light. Therefore, a light sensing film capable of sensing an abnormal change of the reflected light can be disposed in the touch display device, thereby identifying the water layer wetted area and effectively preventing mistaken touch caused by liquid.

Figure 1:
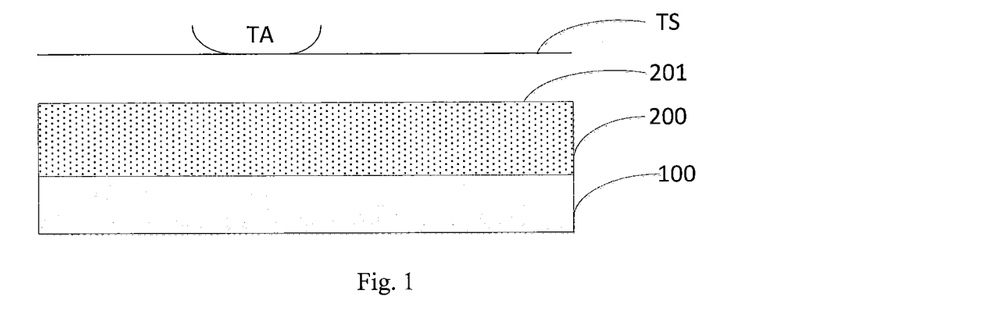
FIG. 1 is a cross-sectional schematic diagram of a touch control component according to an embodiment of the present disclosure.

In view of this, in an aspect of the disclosure, an embodiment of the present disclosure provides a touch control component. Referring to FIG. 1, the touch control component includes: a touch electrode layer 100 configured to sense a touch area TA within a touch surface TS; and a light sensing film 200 superposed with the touch electrode layer 100. A light receiving surface 201 of the light sensing film 200 faces the touch surface TS. Optionally, as shown in FIG. 1, the light sensing film 200 is located at a side of the touch electrode layer 100 for sensing reflected light from the touch surface TS. It will be understood by those skilled in the art that "the light receiving surface of the light sensing film" refers to the surface of the light sensing film for receiving and sensing light, thus light incident on this surface can be detected.

The touch control component has a simple structure and is easy to implement. By sensing the intensity of the reflected light from the touch surface using the light sensing film, the wetted area of the water layer can be identified, thereby effectively avoiding mistaken touch caused by liquid. Therefore, unexpected feedback of the touch screen caused by the wetted area can be effectively avoided, and the interference of the water layer is reduced. The sensitivity of the above structure for identifying mistaken touch caused by liquid is relative high, thereby improving the user experience.

In the context of the present disclosure, a "touch surface" refers to a surface that is in direct contact with a touch object (e.g., a user's finger, a stylus, etc.). The touch surface may be a surface of an element in the touch control component, or a surface of a device or apparatus that includes the touch control component. For example, the touch surface may be an outer surface of a substrate of the touch control component, or may be an outer surface of a touch screen or a touch display device including the touch control component. In the embodiments of the present disclosure, the touch surface TS and the touch electrode layer 100 may be substantially parallel. Those skilled in the art can understand that for the flexible display device, a substantially constant interval may be arranged between the touch surface TS and the touch electrode layer 100.

In the context of the present disclosure, "superpose" refers to placing two or more layers/plate elements together in a stacked manner. Two or more layers/plate elements disposed in a stack may or may not be in direct contact. In the context of the present disclosure, a mistaken touch includes not only a mistaken touch caused by water layer but also a mistaken touch caused by other liquids. In the embodiments of the present disclosure, for the convenience of description, only the mistaken touch caused by water layer is illustrated as an example.

In addition, it can be understood that the specific structure of the touch electrode layer is not particularly limited, as long as the function of detecting the touch area can be effectively utilized, and those skilled in the art may select the specific structure of the touch electrode layer according to actual needs. For example, the touch electrode layer may include any conventional capacitive touch electrode known in the art. In some embodiments of the present disclosure, the touch electrode layer includes a transmitting electrode (Tx) and a receiving electrode (Rx), and the manner in which Tx and Rx are disposed is not particularly limited. Those skilled in the art may select the setting mode of Tx and Rx according to actual needs. For example, Tx and Rx can be set in the same layer or in different layers.

According to an embodiment of the present disclosure, the material of the touch electrode layer may be a transparent material such as indium tin oxide, or may be an opaque material such as metal (e.g., copper, gold, silver, etc.), which may be selected by those skilled in the art according to actual needs.

According to an embodiment of the present disclosure, the light sensing film is located on a side of the touch electrode layer facing the touch surface, or may be located on a side of the touch electrode layer away from the touch surface. These two structures can effectively prevent mistaken touch caused by liquid. It should be noted that the description "the light sensing film is located on a side of the touch electrode layer" used in the specification means that the light sensing film may be in direct contact with the touch electrode layer, or the light sensing film and the touch electrode layer are not in direct contact, and other similar descriptions are the same. In some optional embodiments of the present disclosure, the light sensing film is located on a side of the touch electrode layer facing the touch surface. In this way, the structure is simple and easy to implement, the light sensing film can sense the reflected light from the touch surface with a high sensitivity, the signal to noise ratio is small. Therefore, the user experience and the effect of preventing mistaken touch caused by liquid are improved.

Figure 2A:
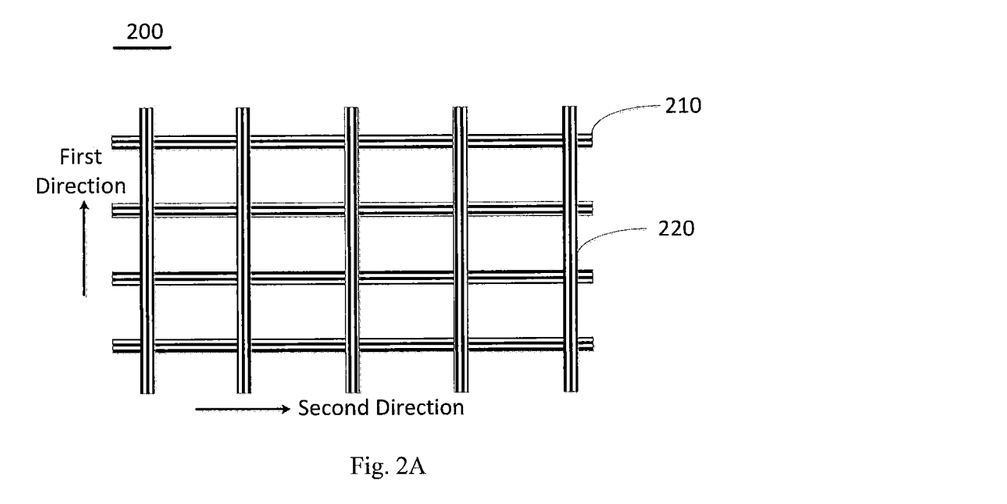
FIG. 2A is a top view of a light sensing film of an embodiment of the present disclosure.

According to an embodiment of the present disclosure, as shown in FIG. 2A, the light sensing film 200 includes a plurality of first photosensors 210 and a plurality of second photosensors 220; the plurality of first photosensors 210 are spaced apart in a first direction, each of the first photosensors 210 extends in a second direction; the plurality of second photosensors 220 are spaced apart in the second direction, each of the second photosensors 220 extends in the first direction; the first direction and the second direction intersect with each other.

Optionally, the plurality of first photosensors 210 may be disposed on the top of the plurality of second photosensors 220. Similarly, the plurality of first photosensors 210 may also be disposed at the bottom of the plurality of second photosensors 220.

Figure 2B:
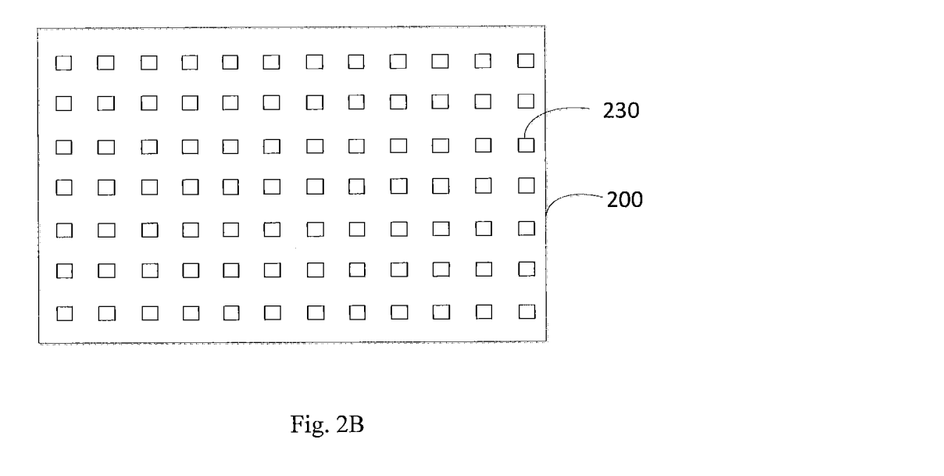
FIG. 2B is a top view of a light sensing film of an embodiment of the present disclosure.
Figure 3:
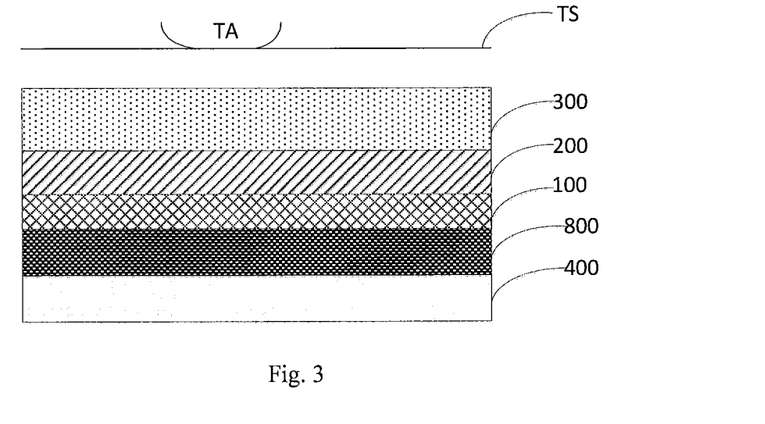
FIG. 3 is a cross-sectional schematic diagram of a touch display device according to an embodiment of the present disclosure.
Figure 4:
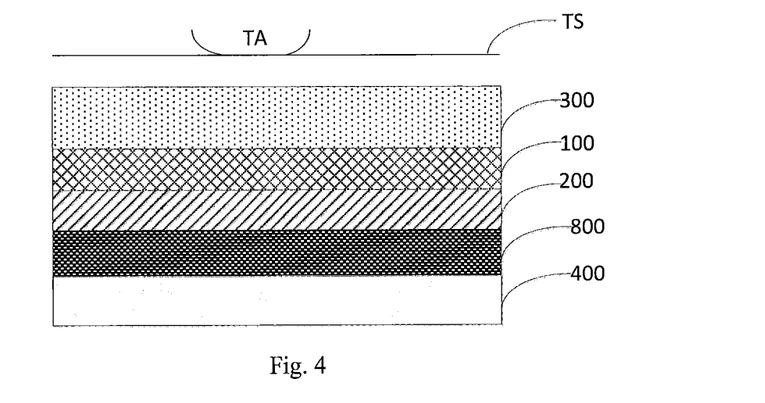
FIG. 4 is a cross-sectional schematic diagram of a touch display device according to an embodiment of the present disclosure.
Figure 5:
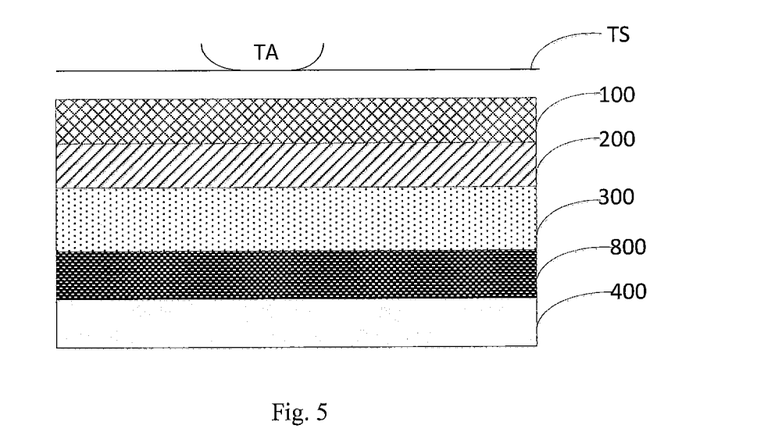
FIG. 5 is a cross-sectional schematic diagram of a touch display device according to an embodiment of the present disclosure.
Figure 6:
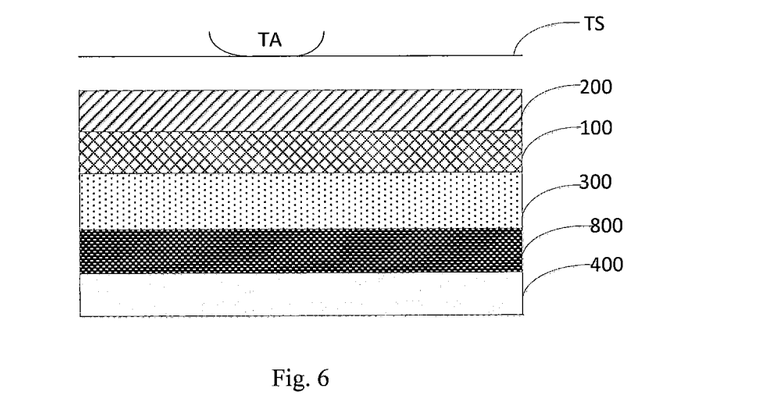
FIG. 6 is a cross-sectional schematic diagram of a touch display device according to an embodiment of the present disclosure.
Figure 7:
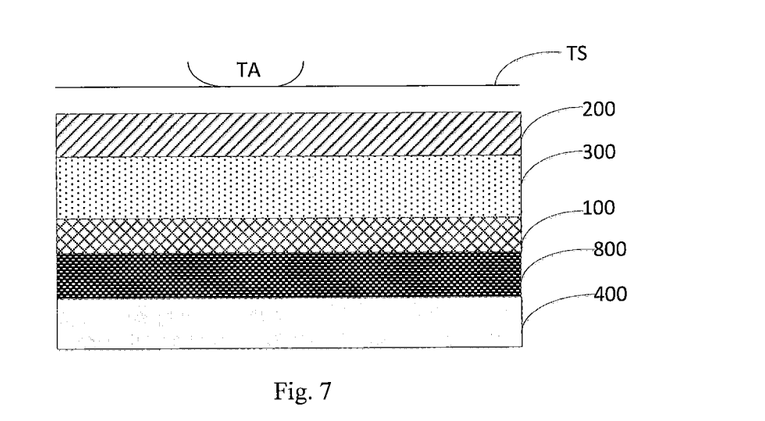
FIG. 7 is a cross-sectional schematic diagram of a touch display device according to an embodiment of the present disclosure.
Figure 8:
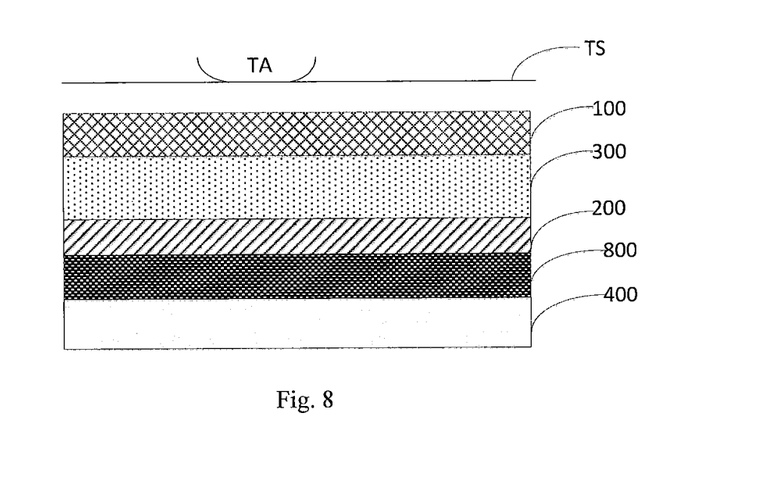
FIG. 8 is a cross-sectional schematic diagram of a touch display device according to an embodiment of the present disclosure.

Optionally, in some embodiments, as shown in FIG. 2B, the light sensing film 200 includes a plurality of light sensors 230 arranged in an array.

It should be noted that FIG. 2A and FIG. 2B are only for explaining the present disclosure, and are not to be construed as limiting the disclosure. The specific structure of the light sensing film can be selected according to actual conditions, and will not be discussed here. Due to the intersection of the first photosensor and the second photosensor, the boundary where the intensity of reflected light changes can be quickly and effectively located, thereby identifying the water layer wetted area.

According to the embodiment of the present disclosure, the shapes of the first photosensor 210, the second photosensor 220, and the photosensor 230 are not particularly limited, which may be selected by those skilled in the art according to actual needs. For example, the shape of the first photosensor and/or the second photosensor may be a strip shape, a wave shape, a bow shape, or the like. In the context of the present disclosure, a "photosensor" may be an element that can convert an optical signal into a voltage/current signal, such as a photosensitive resistance element, a photovoltaic element, a photodiode, or the like.

According to the embodiments of the present disclosure, the specific arrangement of the light sensing film and the touch electrode layer is not particularly limited. The orthographic projection of the light sensing film on the touch surface and the orthographic projection of the touch electrode layer on the touch surface may be at least partially overlapping, or may be not overlapping. When the touch control component is applied to the touch display device, in order to ensure the normal operation of the display function, both the light sensing film and the touch electrode layer may be transparent. In some embodiments of the present disclosure, in order to increase the transmittance of the display device, the plurality of first photosensors may be stacked with the layer of the transmitting electrode Tx, and the plurality of second photosensors may be stacked with the layer of the receiving electrode Rx. The light sensing film and the touch electrode layer may be disposed in contact with each other or may be spaced apart, and those skilled in the art may select the specific arrangement according to actual needs.

In some optional embodiments of the present disclosure, as shown in FIG. 1, the orthographic projection of the touch electrode layer 100 on the touch surface TS covers the orthographic projection of the photo sensing film 200 on the touch surface TS. Therefore, when the touch control component is used in a touch display device, the light sensing film does not reduce the transmittance of the touch display device, thereby ensuring a good display effect.

According to an embodiment of the present disclosure, the material of the light sensing film may be a semiconductor material having an absorption peak in a light emission band of the backlight, and may include, for example, but not limited to, a photosensitive resistance material or a photovoltaic material (including, for example, but not limited to, amorphous silicon material, etc.). Therefore, by detecting the resistance or the current, the intensity of the reflected light from the touch surface can be effectively obtained. The photosensitive material has a wide range of sources, thus a desired sensitivity for the reflected light and a desired performance of the light sensing film may be obtained.

Those skilled in the art will understand that in order to ensure normal operation of the light sensing film, the light sensing film may be connected to a controller for controlling the operation of the light sensing film through a connector.

According to a specific embodiment of the present disclosure, the light sensing film includes the first light sensors and the second light sensors described above, and the specific working principle of the light sensing film may be as follows. The reflected light from the touch surface is irradiated to the first light sensor and the second photosensor, so that the first photosensor and the second photosensor generate an electrical signal (current or resistance). The magnitude of the above electrical signal is related to the intensity of the reflected light, thus the intensity of the reflected light can be obtained by detecting the magnitude of the electrical signal. Since the first photosensor and the second photosensor are disposed to intersect with each other, the intensity of the reflected light at different positions can be determined based on the generated current or resistance at the intersection position of the first photosensor and the second photosensor. According to the change of the reflected light intensity at multiple positions, it can be determined whether the touch area is a water layer wetted area. Specifically, the change trend of light intensity may include the following two situations. First, in the direction from the edge of the touch area to the center of the touch area, the intensity of the reflected light becomes weaker at the edge of the touch area, and gradually increases from the edge of the touch area to the center of the touch area. This situation corresponds to mistaken touch caused by liquid. The controller may perform a series of treatments to eliminate the influence of mistaken touch caused by liquid. Second, in the direction from the edge of the touch area to the center of the touch area, the intensity of the reflected light becomes weaker at the edge of the touch area, and remains unchanged from the edge of the touch area to the center of the touch area. This situation corresponds to the user's desired touch. The touch area now corresponds to a normal touch position (i.e., an effective touch area), and then normal touch feedback is generated.

In another aspect of the disclosure, an embodiment of the present disclosure provides a touch display device. According to an embodiment of the present disclosure, as shown in FIGS. 3-18, the touch display device includes: a display panel including a first substrate 300, and the touch control component according to any one of the above embodiments. The touch electrode layer of the touch control component is superposed with the first substrate. The touch control component has a simple structure and is easy to implement. By sensing the intensity of the reflected light from the touch surface using the light sensing film, the wetted area of the water layer can be identified, thereby effectively avoiding mistaken touch caused by liquid. Therefore, unexpected feedback of the touch screen caused by the wetted area can be effectively avoided, and the interference of the water layer is reduced. The sensitivity of the above structure for identifying mistaken touch caused by liquid is relative high, thereby improving the user experience.

As shown in FIGS. 3-18, the display panel may include the first substrate 300 and a second substrate 400. It can be understood that the materials of the first substrate and the second substrate may be glass or resin or the like. According to an embodiment of the present disclosure, in order to emit light from the touch display device, referring to FIGS. 3-18, a display function element 800 may be further disposed between the first substrate 300 and the second substrate 400.

According to the embodiments of the present disclosure, the type of the touch display device is not particularly limited. When classified according to the type of the display function element, the touch display device may be, but is not limited to, an LCD display device or an OLED display device, or the like. If the touch display device is an LCD display device, the display function element includes a liquid crystal layer; if the touch display device is an OLED display device, the display function element includes a light emitting layer. When classified according to the position of the touch electrode layer, the touch display device may be, but is not limited to, an on-cell display device, an in-cell display device, or an OGS display device. It should be noted that if the touch display device is an In-cell display device, the light sensing film is located on a side of the liquid crystal layer facing the touch surface.

According to the touch display device of the above embodiment of the present disclosure, the positions of the touch electrode layer and the light sensing film are not particularly limited. For example, the touch electrode layer and the light sensing film may be disposed in contact with each other or may be spaced apart, and those skilled in the art may select the specific arrangement according to actual needs.

In some embodiments, the touch display device further includes a second substrate located opposite to the first substrate. The touch electrode layer is located on a surface of the first substrate facing or away from the second substrate, and the light sensing film is located on a surface of the touch electrode layer facing or away from the first substrate.

In some embodiments, the touch display device further includes a second substrate located opposite to the first substrate. One of the touch electrode layer and the light sensing film is located on a surface of the first substrate facing the second substrate; the other of the touch electrode layer and the light sensing film is located on a surface of the first substrate away from the second substrate.

If the touch electrode layer is disposed in contact with the light sensing film, the structure of the touch display device may be one of the following structures. In some embodiments of the present disclosure, referring to FIG. 3, the light sensing film 200 is located on the surface of the first substrate 300 facing the second substrate 400, and the touch electrode layer 100 is located on the surface of the light sensing film 200 facing the second substrate 400. In other embodiments of the present disclosure, with reference to FIG. 4, the touch electrode layer 100 is located on the surface of the first substrate 300 facing the second substrate 400, and the light sensing film 200 is located on the surface of the touch electrode layer 100 away from the first substrate 300. In other embodiments of the present disclosure, referring to FIG. 5, the light sensing film 200 is located on the surface of the first substrate 300 away from the second substrate 400, and the touch electrode layer 100 is located on the surface of the light sensing film 200 away from the first substrate 300. In other embodiments of the present disclosure, with reference to FIG. 6, the touch electrode layer 100 is located on the surface of the first substrate 300 away from the second substrate 400, and the light sensing film 200 is located on the surface of the touch electrode layer 100 away from the first substrate 300. It should be noted that FIGS. 3-6 are only used to illustrate the disclosure, and are not to be construed as limiting the disclosure. The structure of the touch panel can be arranged according to actual conditions. These structures have a wide range of applications, can meet the needs of different touch display devices, and are beneficial to improve detection sensitivity and accuracy.

When the touch electrode layer is spaced apart from the light sensing film, the structure of the touch display device may be one of the following structures. In some embodiments of the present disclosure, referring to FIG. 7, the touch electrode layer 100 is located on the surface of the first substrate 300 facing the second substrate 400, and the light sensing film 200 is located on the surface of the first substrate 300 away from the second substrate 400. In other embodiments of the present disclosure, referring to FIG. 8, the light sensing film 200 is located on the surface of the first substrate 300 facing the second substrate 400, and the touch electrode layer 100 is located on the surface of the first substrate 300 away from the second substrate 400. These structures have a wide range of applications, can meet the needs of different touch display devices, and are beneficial to improve detection sensitivity and accuracy.

According to an embodiment of the present disclosure, referring to FIG. 9 to FIG. 14, a color film layer 500 may be disposed on the side of the first substrate 300 facing the second substrate 400. The color film layer 500 includes a black matrix 510 and a plurality of color filters 520 disposed in the same layer.

Figure 9:
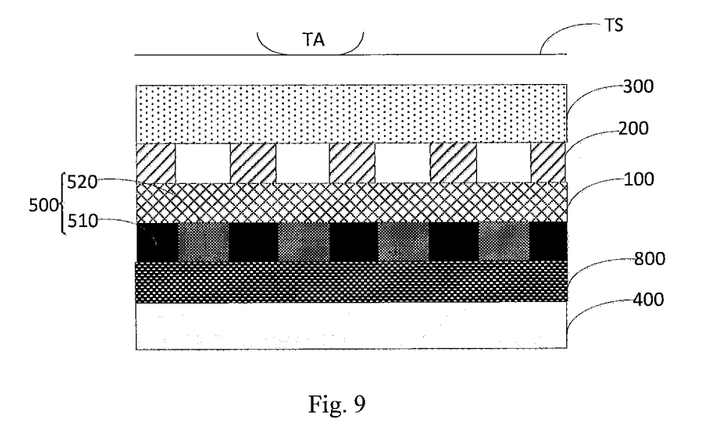
FIG. 9 is a cross-sectional schematic diagram of a touch display device according to an embodiment of the present disclosure.
Figure 10:
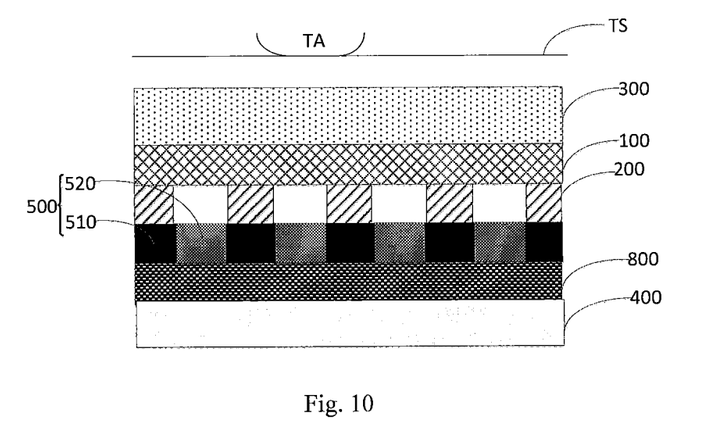
FIG. 10 is a cross-sectional schematic diagram of a touch display device according to an embodiment of the present disclosure.
Figure 11:
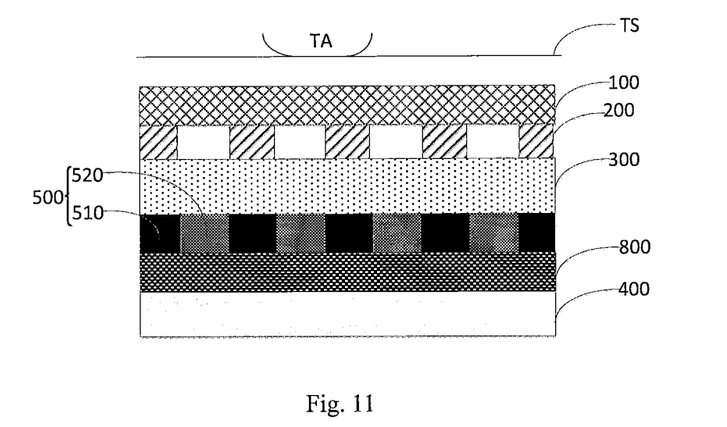
FIG. 11 is a cross-sectional schematic diagram of a touch display device according to an embodiment of the present disclosure.
Figure 12:
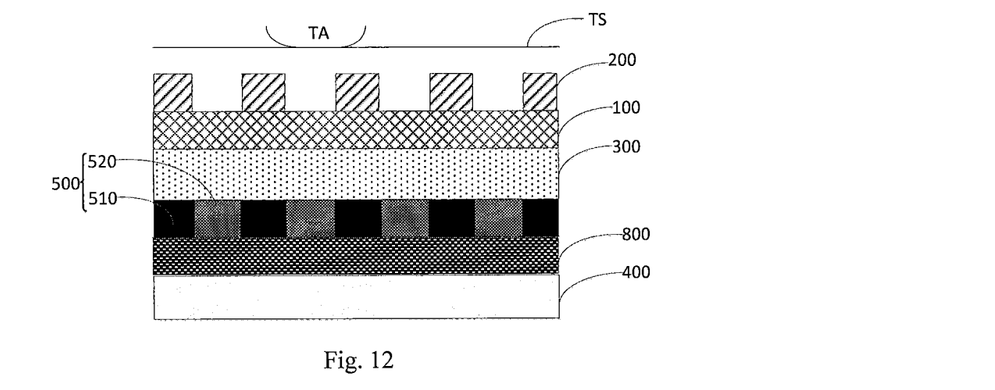
FIG. 12 is a cross-sectional schematic diagram of a touch display device according to an embodiment of the present disclosure.
Figure 13:
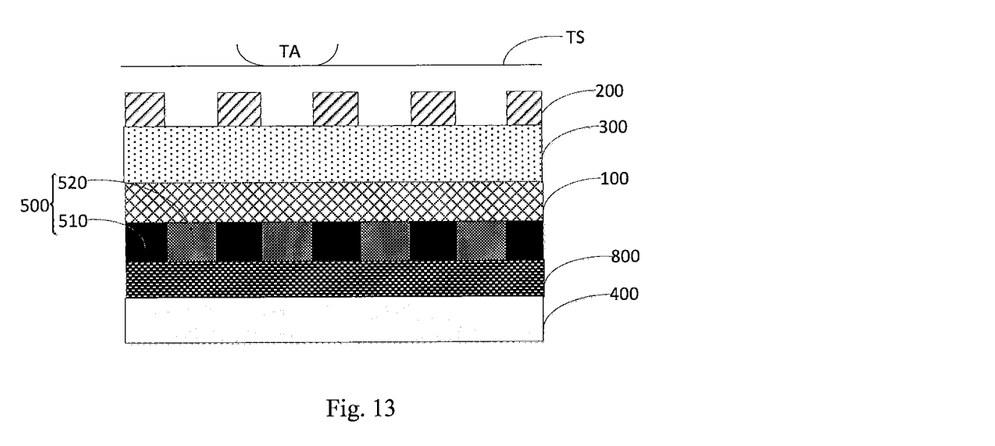
FIG. 13 is a cross-sectional schematic diagram of a touch display device according to an embodiment of the present disclosure.
Figure 14:
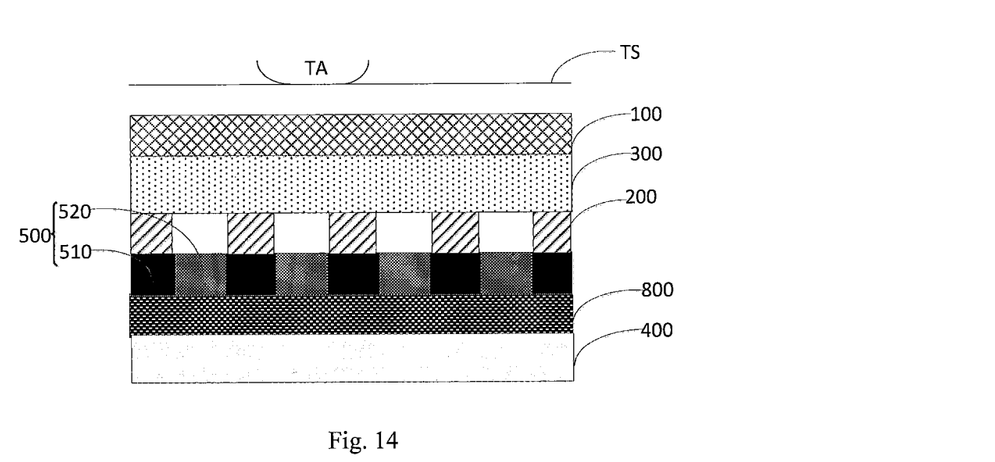
FIG. 14 is a cross-sectional schematic diagram of a touch display device according to an embodiment of the present disclosure.

It should be noted that FIG. 9 only shows one of the structures for the touch display device, which is only used to illustrate the present disclosure, and is not to be construed as limiting the disclosure. With such a configuration, the interference of the direct light from the backlight on the detection result can be reduced, the sensitivity and the accuracy can be improved, and the adverse effect on the transmittance of the touch display device can also be reduced.

In some embodiments, as shown in FIGS. 2A and 9-14, the touch display device further includes a black matrix 510. The black matrix 510 is located on a side of the light sensing film 200 away from the touch surface TS. The light sensing film 200 includes a plurality of first photosensors 210 and a plurality of second photosensors 220; the plurality of first photosensors 210 are spaced apart in a first direction, each of the first photosensors 210 extends in a second direction; the plurality of second photosensors 220 are spaced apart in the second direction, each of the second photosensors 220 extends in the first direction; the first direction and the second direction intersect with each other. An orthographic projection of the black matrix 510 on the first substrate 300 completely covers an orthographic projection of the plurality of first photosensors 210 and the plurality of second photosensors 220 on the first substrate 300.

In some embodiments, as shown in FIGS. 2B and 9-14, the touch display device further includes a black matrix 510. The black matrix 510 is located on a side of the light sensing film 200 away from the touch surface TS. The light sensing film 200 includes a plurality of photosensors 230 arranged in an array. An orthographic projection of the black matrix 510 on the first substrate 300 completely covers an orthographic projection of the plurality of photosensors 230 on the first substrate 300.

It can be understood that, in the above arrangement, the orthographic projection of the black matrix on the first substrate may cover the orthographic projection of the photo sensing film and the touch electrode layer on the first substrate. In this way, these structures have a wide range of applications, can meet the needs of different touch display devices, and are beneficial to improve detection sensitivity and accuracy.

In addition, the structure and material of the color film layer may be consistent with the conventional color film layer, and will not be further described herein.

In some embodiments, the touch display device further includes a protective cover plate superposed with the first substrate. A surface of the protective cover plate facing away from the first substrate serves as the touch surface. The light sensing film is located between the protective cover plate and the first substrate. Therefore, the protective cover plate can effectively protect the touch display device and effectively extend the service life of the touch display device. The touch electrode layer and the light sensing film may be directly located on the protective cover plate. It can be understood that the structure and material of the protective cover plate can be consistent with the conventional protective cover plate, and will not be described in detail herein.

In some embodiments, the touch display device further includes a polarizer located between the protective cover plate and the first substrate. One of the touch electrode layer and the light sensing film is located between the protective cover plate and the polarizer; the other of the touch electrode layer and the light sensing film is located on one of: a surface of the protective cover plate facing the first substrate, a surface of the polarizer facing the protective cover plate, a surface of the polarizer away from the protective cover plate, a surface of the first substrate facing the protective cover plate, and a surface of the first substrate away from the protective cover plate. In this embodiment, the positions of the touch electrode layer and the light sensing film are not particularly limited, and can be arranged by those skilled in the art according to actual needs.

Figure 15:
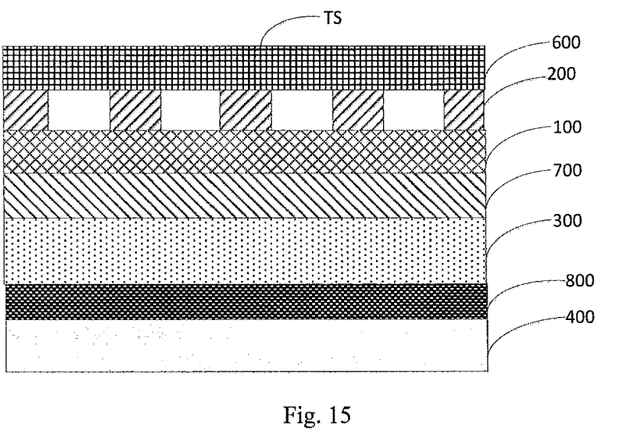
FIG. 15 is a cross-sectional schematic diagram of a touch display device according to an embodiment of the present disclosure.
Figure 16:
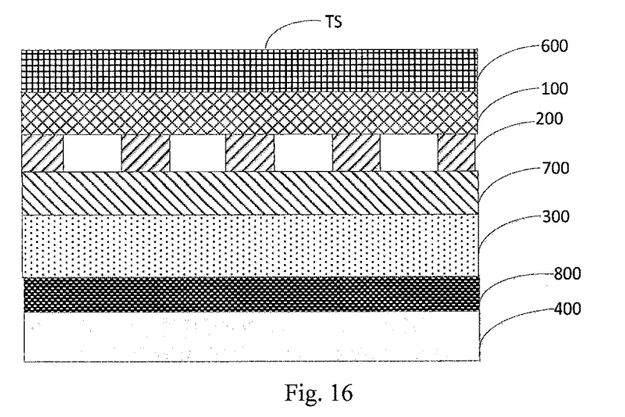
FIG. 16 is a cross-sectional schematic diagram of a touch display device according to an embodiment of the present disclosure.
Figure 17:
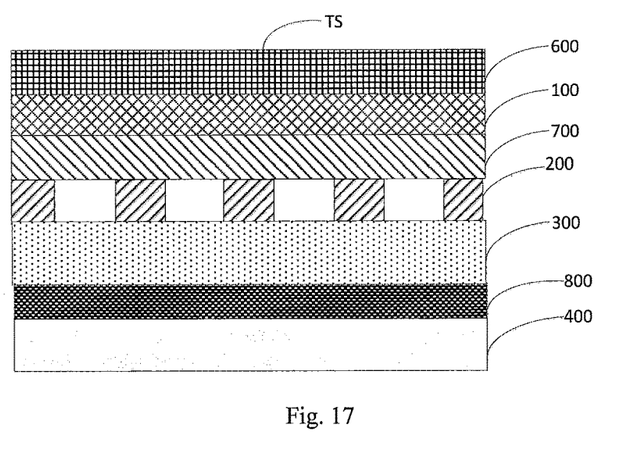
FIG. 17 is a cross-sectional schematic diagram of a touch display device according to an embodiment of the present disclosure.
Figure 18:
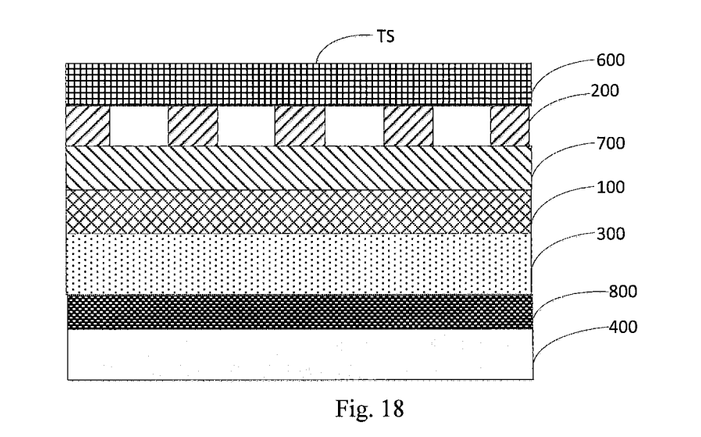
FIG. 18 is a cross-sectional schematic diagram of a touch display device according to an embodiment of the present disclosure.

In some embodiments of the present disclosure, referring to FIG. 15, the touch electrode layer 100 is located between the protective cover plate 600 and the polarizer 700, and the light sensing film 200 is located on the surface of the protective cover plate 600 facing the first substrate 300. In other embodiments of the present disclosure, referring to FIG. 16, the touch electrode layer 100 is located between the protective cover plate 600 and the polarizer 700, and the photo sensing film 200 is located on the surface of the polarizer 700 facing the protective cover plate 600. In other embodiments of the present disclosure, referring to FIG. 17, the touch electrode layer 100 is located between the protective cover plate 600 and the polarizer 700, and the light sensing film 200 is located on the surface of the polarizer 700 away from the protective cover plate 600. In other embodiments of the present disclosure, referring to FIG. 18, the light sensing film 200 is located between the protective cover plate 600 and the polarizer 700, and the touch electrode layer 100 is located on the surface of the first substrate 300 facing the protective cover plate 600. It should be noted that the above-mentioned embodiments are only local structural schematic diagrams of the touch electrode layer and the light sensing film. The structures can be arranged according to actual conditions in practical applications, and the positions of the light sensing film and the touch electrode layer in the above embodiments are interchangeable. In this way, these structures have a wide range of applications, can meet the needs of different touch display devices, and are beneficial to improve detection sensitivity and accuracy.

It should be noted that FIGS. 15-18 show that the touch electrode layer is located between the protective cover plate and the polarizer, that is, the protective cover plate is spaced apart from the polarizer. According to an embodiment of the present disclosure, the protective cover plate and the polarizer may also be disposed in direct contact. Specifically, the polarizer may be located on the surface of the protective cover plate facing the first substrate. The arrangement of the touch electrode layer, the light sensing film, the first substrate, the second substrate, the display function element, or the color filter substrate can be referred to FIGS. 3-14, which will not be repeated herein.

It can be understood that the structure and type of the protective cover plate and the polarizer may be the same as those of the conventional protective cover plate and polarizer, and will not be further described herein.

According to an embodiment of the present disclosure, in addition to the structure described above, the touch display device may further include a package structure, electrodes, a CPU, a casing, and the like, which will not be described in detail.

According to the embodiments of the present disclosure, the principle that the touch display device prevents mistaken touch caused by liquid may be as follows.

Figure 19:
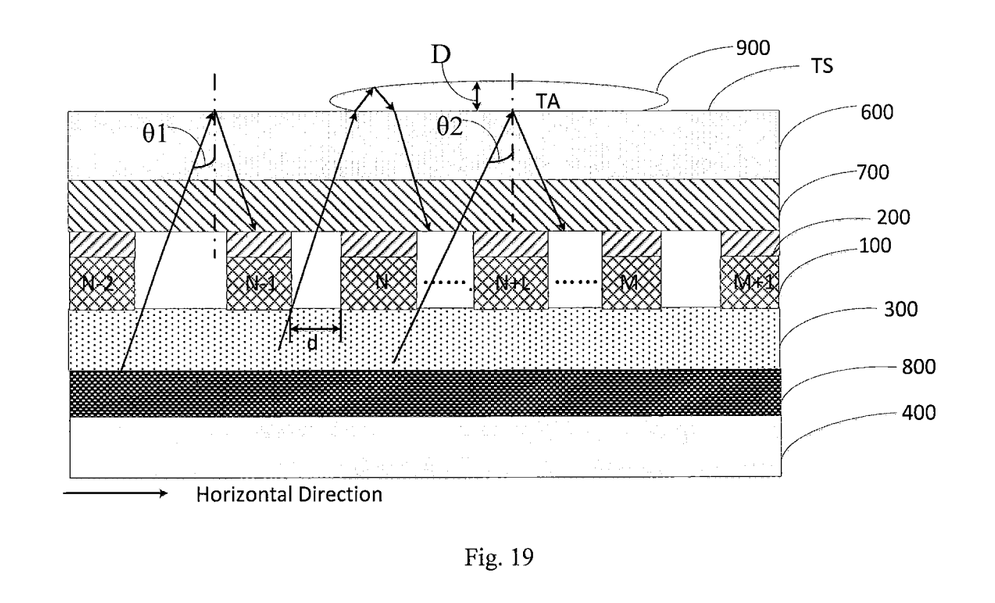
FIG. 19 is a schematic diagram of a touch display panel preventing mistaken touch caused by liquid according to an embodiment of the present disclosure.
Figure 20:
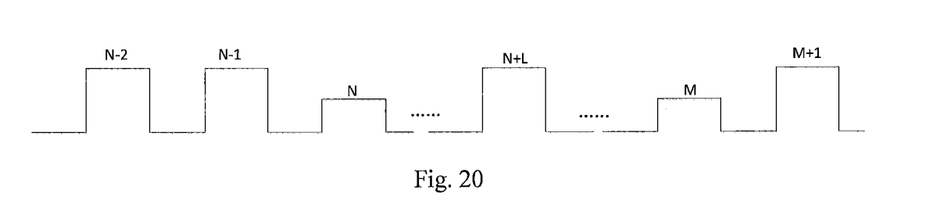
FIG. 20 is a schematic diagram showing signal changes of a touch electrode layer at a wetted area according to an embodiment of the present disclosure.

Specifically, referring to FIG. 19, in the unwetted area of the touch surface, when the incident angle of light from the backlight is greater than or equal to the critical angle $\theta 1$, total reflection occurs on the touch surface to form a white signal of reflected light (including but not limited to a current or resistance of Tx and Rx, etc.). In the wetted area below the water layer 900 (at the Nth~Mth Tx/Rx), total reflection occurs when the incident angle of light emitted by the backlight is greater than or equal to the critical angle $\theta 2$. Since the refractive index of water is between the refractive index of glass and the refractive index of air, it is known that $\theta 2$ is necessarily larger than $\theta 1$. Therefore, in the vicinity of the edge of the wetted area (at the Nth and Mth Tx/Rx), the reflected light signal is abruptly changed due to the change of the interface property (the signal change of the wetted area can be referred to FIG. 20). Specifically, the intensity of the reflected light is significantly weakened, so that the electrical signal of the Nth or Mth Tx/Rx becomes weak. In the wetted area, due to total reflection of the light passing through the water layer, the intensity of the reflected light can almost be restored to the intensity of the normal reflected light (i.e., the intensity of the reflected light in the unwetted area), and the intensity of the electrical signal (e.g., resistance, current, etc.) can also be restored. For example, the electrical signal at the (N+L)th Tx/Rx in the figure can be restored to an intensity comparable to the white signal of reflected light. Since the total reflection angle and the refractive index of the materials on both sides of each interface are known, when the Touch IC detects an abnormal electrical signal in the wetted area, the thickness D of the water layer can be obtained based on the arrangement period d of the Tx/Rx in the horizontal direction (the spacing between two adjacent transmitting electrodes or two adjacent receiving electrodes) and the ordinal difference (e.g., (N+L)−N=L) of the Tx at which the electrical signal is restored. After calculating the thickness of the water layer, the Tx/Rx drive signal or the value of the detected signal can be compensated accordingly, and the electrical influence of the water layer is deducted, thereby preventing mistaken touch.

In another aspect of the present disclosure, a method for preventing mistaken touch caused by liquid is provided, and the method is performed in the touch display device according to any one of the above-mentioned embodiments. According to an embodiment of the present disclosure, referring to FIG. 21, the method includes the following steps.

Figure 21:
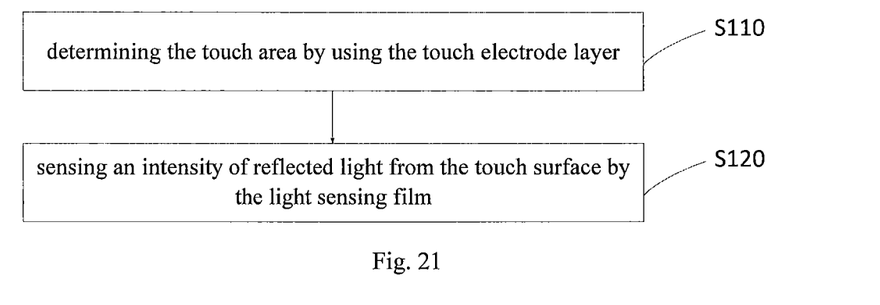
FIG. 21 is a flow chart of a method for preventing moisture from being touched by a touch display device according to an embodiment of the present disclosure.

S110, determining the touch area by using the touch electrode layer.

According to the embodiment of the present disclosure, the touch electrode layer is consistent with the foregoing description, and the details are not described herein again.

It can be understood that the touch area may be a normal touch area caused by a user's normal touch operation or a false touch area wetted by a water layer.

S120, sensing an intensity of reflected light from the touch surface by the light sensing film.

Specifically, the change trend of light intensity may include the following two situations. First, in the direction from the edge of the touch area to the center of the touch area, the intensity of the reflected light becomes weaker at the edge of the touch area, and gradually increases from the edge of the touch area to the center of the touch area. This situation corresponds to mistaken touch caused by liquid. The controller may perform a series of treatments to eliminate the influence of mistaken touch caused by liquid. Second, in the direction from the edge of the touch area to the center of the touch area, the intensity of the reflected light becomes weaker at the edge of the touch area, and remains unchanged from the edge of the touch area to the center of the touch area. This situation corresponds to the user's desired touch. The touch area now corresponds to a normal touch position (i.e., an effective touch area), and then normal touch feedback is generated. By sensing the intensity of the reflected light from the touch surface using the light sensing film, the wetted area of the water layer can be identified, thereby effectively avoiding mistaken touch caused by liquid. Therefore, unexpected feedback of the touch screen caused by the wetted area can be effectively avoided, and the interference of the water layer is reduced. The sensitivity of the above structure for identifying mistaken touch caused by liquid is relative high, thereby improving the user experience.

According to the embodiment of the present disclosure, the light sensing film is consistent with the foregoing description, and the details are not described herein again.

Figure 22:
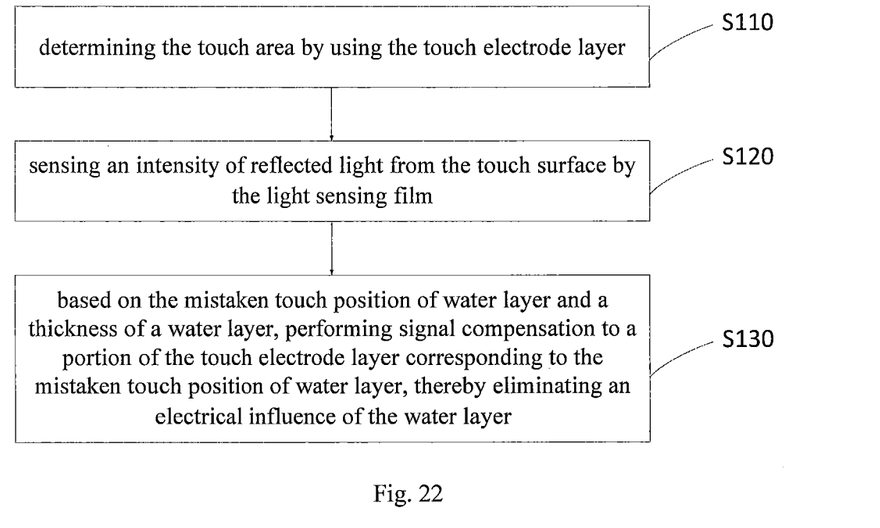
FIG. 22 is a flow chart of a method for preventing mistaken touch caused by liquid performed by a touch display device according to another embodiment of the present disclosure.

According to an embodiment of the present disclosure, referring to FIG. 22, the method may further include the following step: S130, based on the mistaken touch position of water layer and a thickness of a water layer, performing signal compensation to a portion of the touch electrode layer corresponding to the mistaken touch position of water layer, thereby eliminating an electrical influence of the water layer. In this way, based on the detection of the reflected light at the position of the water layer, the signal from the corresponding touch electrodes can be compensated, thereby eliminating the influence of the water layer, so that the normal touch function can be realized at the position of the water layer.

It should be noted that the principle of preventing mistaken touch caused by liquid is consistent with the foregoing description, and will not be repeated here.

In another aspect of the disclosure, the present disclosure provides a method of manufacturing a touch control component. According to an embodiment of the present disclosure, referring to FIG. 23, the method includes the following steps.

Figure 23:
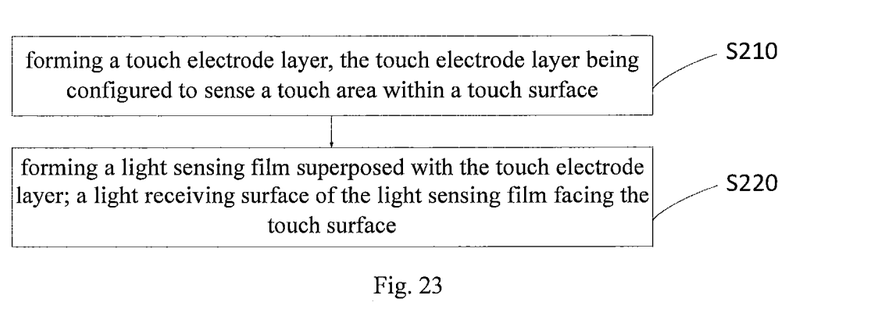
FIG. 23 is a flow chart of a method for manufacturing a touch control component according to an embodiment of the present disclosure.

S210, forming a touch electrode layer, the touch electrode layer being configured to sense a touch area within a touch surface.

According to the embodiment of the present disclosure, the touch electrode layer is consistent with the foregoing description, and details are not described herein again. According to the embodiment of the present disclosure, the process of forming the touch electrode layer is not particularly limited, and those skilled in the art can arrange this process according to actual needs. For example, the process of forming the touch electrode layer may be printing, spraying, etching, or photolithography.

S220, forming a light sensing film superposed with the touch electrode layer; a light receiving surface of the light sensing film facing the touch surface.

According to the embodiment of the present disclosure, the light sensing film is consistent with the foregoing description, and details are not described herein again. According to the embodiment of the present disclosure, the process of forming the light sensing film is not particularly limited, and those skilled in the art can arrange this process according to actual needs. For example, the process of forming the light sensing film may be printing, spraying, etching, or photolithography.

According to an optional embodiment of the present disclosure, the touch electrode layer and the light sensing film may be formed using the same mask plate. That is, the touch electrodes in the touch electrode layer and the photosensitive elements in the light sensing film can be formed by the same mask plate. Therefore, forming the touch electrode layer and the light sensing film by using the same mask plate can reduce the cost and simplify the process. It can be understood that the material of the mask plate is the same as that of the conventional mask plate, and will not be described herein.

The inventors have found that the above method is simple, convenient, and easy to implement. Forming the touch electrode layer and the light sensing film by using the same mask plate can reduce the cost and simplify the process. The touch control component manufactured by the method has the same features and advantages as described above, and will not be repeated herein.

According to an embodiment of the present disclosure, in a conventional touch display device, if the protective cover plate is wetted by a water layer, mistaken touch is caused by the water layer in the wetted area, and unexpected contact feedback may be generated, which may affect the experience of the consumer. In the present disclosure, by providing a light sensing film in the touch control component, abnormal reflected light from the water layer is detected to identify the wetted area. The touch IC compensates the electric signal of the wetted area detected by the touch electrode layer, and deducts the electrical influence of the water layer. In this way, the occurrence of mistaken touch caused by the water layer can be effectively prevented and the user's experience is improved.

In the description of the present disclosure, it is to be understood that the orientation or positional relationship indicated by the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like is based on the orientation or positional relationship shown in the drawings, and is merely for the convenience of describing the present disclosure and simplifying the description. The orientation or positional relationship is not intended to indicate or imply that the device or component must be constructed and operated in a particular orientation, and should not to be construed as limiting the disclosure.

Moreover, the terms "first" and "second" are used for descriptive purposes only and are not to be construed as indicating or implying a relative importance or implicitly indicating the number of the technical features. Thus, the features defined by "first" or "second" may include one or more of the features either explicitly or implicitly. In the description of the present disclosure, the meaning of "a plurality" is two or more unless explicitly and specifically defined otherwise.

In the present disclosure, the terms "install", "link", "connect", "fix", and the like, are to be understood broadly. For example, a connection for the elements may be a fixed connection, a detachable connection, or an integral connection; it may be a mechanical connection or an electrical connection. The connection may be a direct connection or an indirect connection through an intermediate medium, which may be the internal communication of the two elements or the interaction of the two elements. The specific meanings of the above terms in the present disclosure can be understood by those skilled in the art based on actual conditions.

In the present disclosure, the first feature "on" or "under" the second feature may mean a direct contact of the first and second features, or the first and second features may be indirectly connected through an intermediate medium, unless otherwise explicitly stated and defined. Moreover, the first feature "above", "over" or "on top of" the second feature may mean that the first feature is directly above or obliquely above the second feature, or that the level of the first feature is higher than that of the second feature. The first feature "below", "under" and "at bottom of" the second feature may mean that the first feature is directly below or obliquely below the second feature, or that level of the first feature is lower than that of the second feature.

In the present specification, the reference term "an embodiment", "some embodiments", "example", "specific example", or "some examples" and the like means that the specific feature, structure, material, or characteristic described in connection with the embodiment or example is included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as the features of various embodiments or examples, may be combined by those skilled in the art without contradicting each other.

While the embodiments of the present disclosure have been shown and described above, it is understood that the above-described embodiments are illustrative and are not to be construed as limiting the scope of the disclosure. Variations, modifications, alterations and variations of the above-described embodiments may be made by those skilled in the art within the scope of the present disclosure.

What is claimed is:

1. A method for preventing mistaken touch caused by liquid, wherein a touch display device comprises a display panel and a touch control component, wherein the display panel comprises a first substrate, wherein the touch control component comprises a touch electrode layer configured to sense a touch area within a touch surface, and a light sensing film superposed with the touch electrode layer, wherein a light receiving surface of the light sensing film faces the touch surface, wherein the touch electrode layer of the touch control component is superposed with the first substrate, and wherein the method comprises:

determining the touch area by using the touch electrode layer;

sensing an intensity of reflected light from the touch surface by the light sensing film; and determining the touch area as one of a mistaken touch position of water layer and a normal touch position based on a change trend of the intensity of the reflected light in a direction from an edge of the touch area to a center of the touch area, wherein the intensity of the reflected light is gradually increased in the direction from the edge of the touch area to the center of the touch area, and the touch area is determined as the mistaken touch position of water layer, and wherein the intensity of the reflected light remains unchanged in the direction from the edge of the touch area to the center of the touch area, and the touch area is determined as the normal touch position.

2. The method according to claim 1, further comprising: based on the mistaken touch position of water layer and a thickness of a water layer, performing signal compensation to a portion of the touch electrode layer corresponding to the mistaken touch position of water layer, thereby eliminating an electrical influence of the water layer.

3. The method according to claim 1, wherein the light sensing film is on a side of the touch electrode layer facing the touch surface.

4. The method according to claim 1, wherein the light sensing film comprises:

a plurality of first photosensors spaced apart in a first direction, each of the first photosensors extending in a second direction; and a plurality of second photosensors spaced apart in the second direction, each of the second photosensors extending in the first direction, wherein the first direction and the second direction intersect with each other.

5. The method according to claim 1, wherein the light sensing film comprises:

a plurality of photosensors arranged in an array.

6. The method according to claim 1, wherein an orthographic projection of the touch electrode layer on the touch surface covers an orthographic projection of the light sensing film on the touch surface.

* * * * *